United States Patent [19]

Strumskis

[11] Patent Number: 4,806,372
[45] Date of Patent: Feb. 21, 1989

[54] NITRITE-FREE-CURING OF BACON AND PRODUCT THEREOF

[75] Inventor: Louis Strumskis, Ocala, Fla.

[73] Assignee: Georgia Oil & Gas Co., Inc., New Port Richey, Fla.

[21] Appl. No.: 797,537

[22] Filed: Nov. 13, 1985

Related U.S. Application Data

[63] Continuation of Ser. No. 702,158, Feb. 15, 1985, abandoned, which is a continuation of Ser. No. 599,369, Apr. 12, 1984, abandoned, which is a continuation of Ser. No. 493,488, May 11, 1983, abandoned, which is a continuation of Ser. No. 375,594, May 5, 1982, abandoned, which is a continuation-in-part of Ser. No. 227,310, Jan. 22, 1981, abandoned.

[51] Int. Cl.$^4$ .................. A23B 4/02; A23B 4/14; A23L 1/314
[52] U.S. Cl. .................. 426/129; 426/265; 426/326; 426/332; 426/641
[58] Field of Search .............. 426/129, 265, 281, 315, 426/324, 326, 331, 332, 335, 641, 650, 652, 410, 415, 523, 266

[56] References Cited

U.S. PATENT DOCUMENTS

| | | | |
|---|---|---|---|
| 169,592 | 11/1875 | Sace | 426/332 |
| 236,521 | 1/1881 | Wickersheimer | 426/265 X |
| 2,613,151 | 10/1952 | Forsyth | 426/266 |
| 2,844,478 | 7/1958 | Hanley et al. | 426/315 X |
| 2,974,047 | 3/1961 | Holmes | 426/265 X |
| 3,220,854 | 11/1965 | Zwart | 426/315 X |
| 3,328,178 | 6/1967 | Alderton | 426/332 X |
| 3,515,561 | 6/1970 | Fuesch et al. | 426/265 |
| 3,595,679 | 7/1971 | Schoch et al. | 426/315 X |
| 3,615,729 | 10/1971 | Baker et al. | 426/650 X |
| 3,666,488 | 5/1972 | Nakao et al. | 426/266 |
| 3,821,438 | 6/1974 | Brown | 426/266 |
| 3,896,242 | 7/1975 | Moore | 426/315 X |
| 3,934,044 | 1/1976 | Busch et al. | 426/332 X |
| 4,250,199 | 2/1981 | Underwood et al. | 426/315 X |
| 4,315,948 | 2/1982 | Sleeth et al. | 426/266 |

FOREIGN PATENT DOCUMENTS

| | | | |
|---|---|---|---|
| 549657 | 12/1957 | Canada | 426/266 |
| 11542 | 10/1908 | United Kingdom | 426/266 |

OTHER PUBLICATIONS

Merory, *Food Flavorings: Composition, Manufacture & Use*, 1960, p. 242.
Tanaka et al., J. Food Protection, 1980, 43 (6), 450-457.

*Primary Examiner*—Arthur L. Corbin
*Attorney, Agent, or Firm*—Millen & White

[57] ABSTRACT

Bacon is rendered resistant to *C. botulinum* by curing with an amount of a nitrite-free pickling solution containing salt, glycerine, acetic acid and smoke flavor which imparts about 2–4% salt, 0.5–1.0% acetic acid, 0.5–2% glycerine and 0.3% smoke flavor contents by weight to fresh pork meat and then heat curing the meat until about 80–90% of the acetic acid is removed from the meat and the cured bacon has a pH of about 4–5.

20 Claims, No Drawings

NITRITE-FREE-CURING OF BACON AND PRODUCT THEREOF

CROSS-REFERENCE TO RELATED APPLICATION

This is a continuation of application Ser. No. 702,158, filed Feb. 15, 1985 as a continuation of application Ser. No. 599,366, filed Apr. 12, 1984 as a continuation of Ser. No. 493,488, filed May 11, 1983 as a continuation of Ser. No. 375,594, filed May 5, 1982 as a continuation-in-part of Ser. No. 277,310, filed Jan. 22, 1981, all now abandoned.

BACKGROUND OF THE INVENTION

This invention relates to a nitrite-free method of curing bacon and to the bacon thus produced The curing process of this invention employs acetic acid in the curing solution. The use of acetic acid to protec meats against spoilage is conventional and well known See, e.g., U.S. Ser. Nos. 125,102; 642,221; 680,374; 909,172; 2,383,907; 3,328,178; 3,380,833; and 3,934,044. I also reported that acetic acid could replace nitrites in the curing of bacon and hams. See Meat Plant Magazine, Vol. 40, No. 2, pp. 10, 36 (May, 1979). Tanaka et al., J. Food Protection, 43, No. 6, pp. 450–457 (1980), report the use of lactic acid bacteria and a source of carbohydrate to inhibit the growth of *Clostridium botulinum* in no nitrite-added bacon at ambient temperatures. The authors cite references in support of their statement that botulinal toxin formation is influenced by pH, water activity, salt, nitrite, inoculum level and temperature. They report that in their experiments a rapid drop in pH, rather than nitrite concentration, appeared to influence botulinal toxin development.

Although acetic acid does, by lowering the pH, reduce the rate of bacterial growth on meats, acetic acid alone does not, at concentrations which do not impart an objectionable sour flavor to the meat, inhibit such growth sufficiently to meet the Department of Agriculture test for antibotulinal control in bacon, which involves injecting a spore suspension containing type A and B strains of *Clostridium botulinum* into bacon, incubating the bacon in a vacuum sealed package at 30° C. and then periodically testing the bacon for toxicity. Therefore, although an acceptably tasting cured bacon can be produced with acetic acid, nitrite-free smoke curing of bacon commercially with acetic acid alone is not possible under existing government regulations.

In addition to acetic acid, this invention also employs glycerine as a vital ingredient of the curing solution. Under Sec. 182.1320 of the FDA regulations, glycerine is listed as a multiple purpose GRAS compound by the Food and Drug Administration. It is commonly used in small amounts as a humectant in a variety of foodstuffs. Wickersheimer, U.S. Ser. No. 236,521, discloses the use of a mixture of salicyclic acid, methyl alcohol, glycerine and various salts, viz., potash, salt and alum, with alum being the chief ingredient, to preserve meat by injecting into the body of the animal prior to or shortly after slaughter and before evisceration.

SUMMARY OF THE INVENTION

In a composition aspect, this invention relates to novel smoke cured bacon, which is free of added nitrites and which is rendered resistant to *C. botulinum* growth by the presence therein of an amount of acetic acid effective to maintain the pH thereof between 4 and 5 and from about 0.5% to 2% by weight of glycerine.

In an article of manufacture aspect, this invention relates to vacuum sealed packaged bacon consisting essentially of smoke cured bacon of this invention, sliced and vacuum sealed in a moisture- and oxygen-impermeable film of transparent plastic.

In a process aspect, this invention relates to a process for producing smoke cured bacon which is resistant to *C. botulinum* growth when stored at ambient temperature in a vacuum sealed package, by impregnating the pork with an aqueous pickling solution and then heating the pork until cured while imparting a smoke flavor thereto, which comprises employing an amount of a nitrite-free pickling solution containing salt, glycerine acetic acid and smoke flavor which imparts about 2–4% salt, 0.5–1.0% acetic acid, 0.5–2% glycerine and 0.3% smoke flavor contents by weight to the fresh meat and heat curing the impregnated meat until about 80–90% of the acetic acid is removed from the meat and the cured acon has a pH of about 4–5.

DETAILED DESCRIPTION

The cured bacon according to this invention contains relatively low levels of acetic acid so that the characteristi sour flavor which acetic acid imparts to foodstuffs is avoided Most of the acetic acid injected into the fresh meat in the start of the curing process is removed during heating in the smokehouse and essentially all of the remainder is eliminated in the final cooking step prior to consumption.

The cured bacon of this invention contains an amount of acetic acid effective to maintain the pH thereof when stored at ambient temperature at from 4 to 5, preferably about 4.3 to 4.9. Although the exact amount of acetic acid employed to achieve this pH range is not critical, impregnatin the fresh meat with about 0.5% to 1.5%, preferably about 0.6 to 0.9% by weight will impart this pH to the cured bacon. A pH lower than 4 imparts an unacceptable sour taste to the cooked bacon and a pH above 5 does not acceptably inhibit growth of *C. bolulinum* in the Department of Agriculture test.

The cured bacon of this invention contains about 0.5% to 2%, preferably about 1–1.5%, e.g., 1.25% to 1.5%, and more preferably about 1.2–1.4% by weight of glycerine (glycerol). Glycerine is a vital ingredient because acetic acid alone does not acceptably protect bacon against *C. botulinum* growth at a pH from 4 to 5.

Because a high moisture content or more specifically a high surface humidity promotes bacterial growth, the bacon of this invention preferably is smokehouse cured until its surface humidity is below saturation, i.e., it has an available moisture value ($a_w$) of less than 1, e.g., no greater than 0.97, preferably from 0.90–0.97 and more preferably about 0.93–0.97, e.g., as measured by an electric Hygrometer Indicator (Hygrodynamics Division of American Instrument Co.)

The cured bacon of this invention is smoke-cured, i.e., a smoke flavor is imparted thereto by exposing the bacon to smoke during curing or by adding conventional smoke flavor thereto as part of the pickling solution or during the curing process. Commercially available smoke flavors presently used for smoke cured bacon are acceptable for this purpose.

The cured bacon of this invention is not salt cured, i.e., it is partially cooked and smoke flavored. Consequently it has the relatively low salt content of conventional nitrite cured bacon, e.g., up to about 4% or less by weight, preferably 2-4%, more preferably about 2-3.5%.

Because the bacon of this invention does not require nitrites, large amounts of salt, or other sources of sodium as part of the curing composition, they are not highly salty to the taste. Therefore, they do not require sucrose, dextrose or other sugars which conventionally are employed to mask the salty flavor of nitrite-cured bacon. Thus, in a preferred embodiment, the cured bacon of this invention is substantially free of sucrose or other added sugars. Moreover, the salty flavor imparted to the bacon by the salt which is included in the curing formula is acceptably masked by the sweet flavor of the glycerine employed therein.

The cured bacon of this invention has much less tendency than conventionally cured bacon to stick to hot metal surfaces when fried It also has a superior meaty flavor.

The cured meats of this invention are superior to conventional nitrite cured meats in their botulinal resistance Typically, conventional nitrite cured bacon will fail the Dept. of Agriculture test and become toxic in about a week at 30° C. whereas the cured meats of this invention remain non-toxic after several weeks. For the first time, there is now available a commercially feasible alternative to the use of salt or nitrites to cure bacon, hams and like meats which are partially precooked in the curing process but ordinarily further cooked prior to consumption to remove fat or enhance flavor.

Thick cuts of fresh meat which are conventionally smoke cured cannot be cured into a cured meat according to the process of this invention because the acetic acid adversely affects the color and flavor thereof. However, the process of this invention produces smoke cured bacon of both acceptable flavor and color and is well suited for the production on a commercial scale of sliced bacon conventionally packaged in a shrink sealed vacuum pack, where toxic Clostridium growth is most apt to occur if the unopened package is stored at ambient temperature. Frankfurters and other cold cuts which are vacuum packed can also be cured according to this invention.

In an article of manufacture aspect, the cured bacon of this invention is vacuum sealed in a moisture- and oxygen-impermeable film of transparent plastic, e.g., polyvinylidene chloride and copolymers of vinylidene chloride and vinyl chloride and is preferably sliced and packaged in packages each containing ½, 1 or 2 lbs. of the bacon of this invention.

To produce the cured bacon of this invention, the starting fresh cut of meat is impregnated in a conventional manner, e.g., by injections at various points along the cut, with the aqueous pickling composition (liquor) containing amounts of acetic acid, glycerine, salt and an approved smoke solution effective to impregnate the pork with the desired amounts thereof when the selected amount of the pickling solution is injected in the meat.

Typically, the pickling solution contains, calculated on the water content thereof, 7-12%, peferably 7-11%, more preferably 8-10%, acetic acid; from 12-17%, preferably 13-15 glycerine; and 20-40%, preferably 25-37% salt. Other seasonings, e.g., garlic, onion and pepper oil, can also be present in the pickling solution. Smoke flavor, e.g., 3% by weight of commercial smoke solution, ordinarily is present to ensure that a smoke flavor is distributed uniformly throughout the bacon.

The starting fresh meat is injected in the conventional manner with an amount of pickling solution which imparts thereto a salt content of at least 2% by weight thereof, e.g., about 2-5%, preferably about 2.5-3% by weight, and an acetic acid content of at least about 0.6-0.9% by weight thereof, the former being dictated by Department of Agriculture regulations for bacon and the latter ensuring that the cured bacon will be free of parasites, such as trichomonas, and that sufficient acetic acid will be retained in the bacon after curing to impart thereto the desired final pH of 4 to 5. It is important that all areas of the pieces of meat receive their proportional amount of the pickling solution because uneven impregnation may result in sections of the meat having a final pH above 5. Such portions may not have acceptable resistance to *C. botulinum* growth.

Typically, the fresh meat is impregnated with about 12-14% by weight of pickling solution, the exact amount depending on the concentrations of acetic acid and glycerine therein and the weight loss which occurs during curing. Desirably, the amount of pickling solution added approximately equals the weight loss which occurs during curing.

To ensure that all portions of the meat is impregnated with the pickling solution, the meat can, if desired, be held at below ambient temperature, e.g., 30°-45° F. for about 4-8 hours, after injection therewith before starting the curing.

Conventionally, smoke cured bacon is rapidly brought to about 140° F. (smokehouse temperature) to sear the exterior surfaces and seal in the juices. However, cooking in this manner sometimes has an undesirable effect upon the color of the cured bacon of this invention and produces a light pink or gray color. Therefore, in its preferred embodiment in the process of this invention, the meat is cured at temperatures ranging from about 120°-140° F., with the highest temperature being reached during about the last half of the cooking time but prior to the end thereof. For example, typically the impregnated meat is first heated at about 120° F., then at 130° F., then at about 140° F. and finally at about 130° F., e.g., for 1 or more hours at each temperature for a total of 5-7 hours for short cures and, e.g., first 1-2 hours at about 120° F., the next 1-2 hours at 130° F., the next 1.5-2.5 hours at 140° F. and the remainder at about 130° F., 10-14 hours for a long cure.

The smoke flavor is imparted to the bacon preferably by injecting an approved smoke solution into the meat, e.g., as part of the pickling solution, by cooking over smoking hickory logs and/or by spraying the meat one or more times during curing with an aqueous aerosol of a synthetic smoke flavor, e.g., once during the middle of the cooking and once just prior to the end thereof. Desirably, about 3% by weight of smoke flavor is employed in the pickling solution and the meat is impregnated with about 0.3% by weight thereof of the smoke flavor.

The cured bacon is substantially free of nitrites, i.e., no more than about 1-2 parts per million. Although nitrites are not employed in this invention for curing purposes, some starting cuts of pork contain detectable amounts of naturally occurring nitrites, usually less than 1 ppm.

Without further elaboration, it is believed that one skilled in the art can, using the preceding description, utilize the present invention ot its fullest extent. The following preferred specific embodiments are, therefore, to be construed as merely illustrative and not limitative of the remainder of the disclosure in any way whatsoever.

EXAMPLE I

Prepare a pickling solution from:

| | |
|---|---|
| Water | 140 lbs. |
| Salt | 40 lbs. |
| Glycerine (food grade) | 20 lbs. |
| Acetic Acid (glacial) | 15 lbs. |

Inject 1600 lbs of bacon cuts of fresh pork in the conventional manner with the above solution (14% by weight). Hold the injected meat in a cooler for 6 hours and then transfer to the smokehouse, heated so as to cook the cuts for 3 hours at an (smokehouse temperature) of 120° F.; then for 3 hours at 130° F., followed by 4 hours at 140° F. and finally for 2 hours at 130° F. (smokehouse temperature). After 1-2 hours of cooking, spray the bacon in a conventional manner with an aerosol of synthetic smoke flavor and again 2 hours before the end of cooking.

EXAMPLE II

Prepare a pickling solution from:

| | |
|---|---|
| Water | 140 lbs. |
| Salt | 44 lbs. |
| Glycerine (food grade) | 20 lbs. |
| Acetic Acid (glacial) | 9½ lbs. |
| Smoke Flavor (Code 10, Hickory Specialites, Inc., Brentwood, Tenn.) | 3 quarts |

Inject 1600 lbs. of bacon cuts of fresh pork in the conventional manner with 13% by weight of the above solution. Hold the injected meat the same as conventional bacon then transfer to the smokehouse, heated so as to cook the cuts for 1.5 hours at a (smokehouse temperature) of 120° F.; then for 1.5 hours at 130° F., followed by 2.5 hours at 140° F. and finally for 1 hour at 130° C. (smokehouse temperature). After 1-2 hours of cooking, spray the bacon for about 75 minutes in a conventional manner with an aerosol of synthetic smoke flavor and again for about 30 minutes about 2 hours before the end of cooking.

In the above examples, about 80-90% of the acetic acid is removed from the meat during the cooking, which loses about 13-15% of its injected weight during cooking. The meat has the characteristic red color of conventionally cured bacon. The glycerine content facilitates automatic slicing and prevents shattering of the fatty meat.

Refrigerate the cured bacon down to 30° F. to provide "temper" and then slice into one pound units and vacuum seal in a conventional heat shrinkable plastic film (Saran Wrap).

The bacon has far less tendency to splatter oil during cooking than conventionally cured bacon. It produces the characteristic bacon color during cooking and has a natural meaty taste.

Vacuum packaged sliced bacon produced according to Example I was tested as follows for resistance to *Clostridium botulinum* growth by Tech S. Corp., a wholly owned subsidiary of National Food Processors Association:

Procedure:

Inoculation and sampling.

A spore suspension composed of 5 type A and 5 type B strains of *Clostridium botulinum* was diluted in gelatinphosphate such that 0.1 ml contained 1000 spores. Spores were injected in 0.1 ml amounts through silicon-based septa fixed to the outside of each package. This allowed for injection of spores without release of vacuum. A total of 20 12-ounce packages of the acetic acid-glycerol (HAc) of Example I were injected, along with 20 16-ounce packages of nitrite ($NO_2$) cured bacon purchased at a local retail market. These along with 9 uninoculated packages of HAc cured bacon were incubated at 30° C.

On day 0 one package of each type of bacon was sampled at 2 sites, one inoculated and one uninoculated. Incubated samples were removed at various time intervals and opened aseptically with a sterile knife. A 30 g sample was removed from the area underneath the septum and blended for one minute with 270 ml of gelatin-phosphate. Additional portions of bacon were removed for pH and water activity determination.

Plate Counts

The blended suspension was further diluted in gelatin-phosphate. Dilutions of the samples were plated in plate count agar (aerobic plate count) and liver veal agar (anerobic plate count). All plates were incubated at 35° C. for 2-3 days; the liver veal agar plates were incubated inside a gaspak anerobic jar.

Toxicity Testing

A portion of the blended suspension was centrifuged and the supernatant used to inject 2 mice (0.5 ml each). Portions of samples which killed mice were combined with polyvalent antibotulinal toxic serum and used to inject mice. An additional 2 mice were injected with samples heated 10 minutes at 100° C. All mice were observed for 4 days for signs of *C. botulinum* intoxication.

pH Determinations

A weighed portion of bacon was mixed with an equivalent (w/v) amount of distilled water and ground in a mortar with a pestle. The pH of the extract was then determined.

Water Activity Determinations

Water activity ($a_w$) was determined using an Aminco-Hygrodynamics system at 80° F. Equilibration times of 16 hours or longer and a 10 second energization were used.

Results and Discussion:

Initial plate counts were low, especially from the HAc cured bacon. By day 3 plate counts on the $NO_2$ cured bacon were quite high, although no spoilage was detected until the next sampling at day 5. Counts on the HAc glycerine cured bac remained low until the sampling on day 10 but never did reach levels as high as the $NO_2$ cured bacon. By the day 5 sampling period, the $NO_2$ cured bacon smelled sour and had a soft, stringy texture, but it had not become toxic. All samples of $NO_2$ cured bacon taken after this time, i.e., by day 7, were soft, stringy and putrid smelling. Only two samples of the HAc glycerine cured bacon (day 19 and day 31) appeared stringy; none had an off-odor. The pH of the $NO_2$ cured bacon was above 6.1; that of the HAc glycerine cured bacon was 5.0 or below. The water activity was lower for HAc cured bacon than for the NO₂ cured bacon. NO₂ cured bacon became toxic by day 7, i.e., out of 15 packages sampled on day 7 or later, 13 were toxic. None of HAc cured bacon sampled on day 7 or later, were toxic, even after 31 days.

These results indicate that the acetic acid-glycerol bacon cure was more effective in inhibiting growth and toxin production by *C. botulinum* than the standard nitrite cure.

COMPARATIVE EXAMPLE

Follow the procedure of Example I or II but omit the glycerine from the pickling solution. The resulting cured bacon does not inhibit *C. botulinum* growth in the above tests as well as standard nitrite cured bacon.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Vacuum packaged substantially nitrite-free smoke cured bacon which is resistant to *C. botulinum* growth at room temperature, comprising an amount of acetic acid effective to maintain the pH thereof at from 4 to 5 and an amount from about 0.5% to 2% by weight thereof of glycerine, effective to render the bacon substantially more resistant to *C. botulinum* growth than achieved by the acetic acid alone.

2. A vacuum packaged smoke cured bacon according to claim 1 having an available moisture value of 0.90 to 0.97.

3. A vacuum packaged smoke cured bacon according to claim 2 having a salt content of 2% to 4% by weight.

4. A vacuum packaged smoke cured bacon according to claim 1 which is substantially sugar-free.

5. A vacuum packaged cured bacon according to claim 1 containing 1% to 1.5% by weight of glycerine and about 2% to 3.5% salt.

6. A vacuum packaged smoke cured bacon according to claim 5 which is substantially sugar-free.

7. Packaged smoke cured sliced pork bacon according to claim 5, vacuum sealed in a moisture- and oxygen-impermeable film of transparent plastic.

8. Packaged smoke cured bacon according to claim 7 which is substantially sugar-free.

9. Packaged smoke cured sliced pork bacon according to claim 1, vacuum sealed in a moisture- oxygen-impermeable film of transparent plastic.

10. A process for producing substantially nitrite-free vacuum packaged smoke cured bacon, which is resistant to *C. botulinum* growth when stored at ambient temperature, by impregnating fresh meat with an aqueous pickling solution, heating the meat until cured while imparting a smoke flavor thereto, and then vacuum packaging the cured meat which comprises impregnating the fresh meat with a nitrite-free pickling solution containing salt, glycerine and acetic acid which imparts about 2–5%, 0.5–1% acetic acid, and 0.5–2% glycerine contents by weight to the fresh meat and heating the impregnated meat until about 80–90% of the acetic acid is removed from the meat and the cured meat has a pH of about 4–5, the amount of glycerine being effective to render the cured meat substantially more resistant to *C. botulinum* growth than is achieved with the acetic acid alone.

11. A process according to claim 10 wherein the fresh meat is impregnated with about 0.9%–1.0% by weight thereof of acetic acid.

12. A process according to claim 10 wherein the fresh meat is impregnated with about 1.2 to 1.5% by weight thereof of glycerine.

13. A process according to claim 10 wherein the fresh meat is impregnated with about 2.5% to 3% by weight thereof of salt.

14. A process according to claim 10 wherein the impregnated meat is heated to an available moisture value of 0.90 to 0.97.

15. A process according to claim 10 wherein the fresh meat is impregnated with about 0.3% by weight of smoke flavor mixed with the pickling solution.

16. A process according to claim 10 wherein the impregnated fresh meat is heated at temperatures ranging from about 120°–140° F., with the highest temperature being reached during about the last half of the curing time but prior to the end thereof.

17. A process according to claim 16 wherein the impregnated fresh meat is heated for about 5–7 hours, the first 1–2 hours at about 120° F., the next 1–2 hours at 130° F., the next 1.5–2.5 hours at about 140° F. and the remainder at about 130° F.

18. A process according to claim 16 wherein the fresh meat is impregnated with about 0.9% by weight thereof of acetic acid, 1.5% by weight thereof of glycerine, 2.5% by weight thereof of salt, 0.3% smoke and the impregnated meat is cured to an available moisture value of 0.90 to 0.97, and has a pH of about 4.3–4.9.

19. A process according to claim 18 wherein the impregnated fresh meat is heated for about 5–7 hours, the first 1–2 hours at about 120° F., the next 1–2 hours at 130° F., the next 1.5–2.5 hours at about 140° F. and the remainder at about 130° F. and wherein the smoke flavor is imparted to the meat by employing a pickling solution containing smoke flavor and spraying the meat at least twice during curing with an aqueous aerosol of a synthetic smoke flavor.

20. A process according to claim 10 wherein the smoke flavor is imparted to the meat by spraying the meat at least once during the heating step with an aqueous aerosol of a synthetic smoke flavor and by including smoke flavor in the pickling solution.

* * * * *